(12) United States Patent
Saitoh et al.

(10) Patent No.: US 7,669,421 B2
(45) Date of Patent: *Mar. 2, 2010

(54) COMBUSTOR OF GAS TURBINE WITH CONCENTRIC SWIRLER VANES

(75) Inventors: Keijiro Saitoh, Takasago (JP); Masataka Ohta, Takasago (JP); Satoshi Tanimura, Takasago (JP); Shigemi Mandai, Takasago (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 969 days.

This patent is subject to a terminal disclaimer.

(21) Appl. No.: 11/334,744

(22) Filed: Jan. 19, 2006

(65) Prior Publication Data

US 2006/0236700 A1    Oct. 26, 2006

(30) Foreign Application Priority Data

Apr. 22, 2005    (JP)    ............................. 2005-124690

(51) Int. Cl.
    *F02C 3/00*    (2006.01)
(52) U.S. Cl. .......................................... 60/748; 60/737
(58) Field of Classification Search .................. 60/737, 60/738, 746–748
    See application file for complete search history.

(56) References Cited

U.S. PATENT DOCUMENTS

| | | | | |
|---|---|---|---|---|
| 5,351,477 A | * | 10/1994 | Joshi et al. | ............... 60/39.463 |
| 5,511,375 A | * | 4/1996 | Joshi et al. | ............... 60/39.463 |
| 6,141,967 A | | 11/2000 | Angel et al. | |
| 6,286,298 B1 | * | 9/2001 | Burrus et al. | ............ 144/134.1 |
| 6,301,899 B1 | * | 10/2001 | Dean et al. | ..................... 60/737 |
| 6,993,916 B2 | * | 2/2006 | Johnson et al. | ............... 60/776 |
| 7,140,560 B2 | * | 11/2006 | Stotts et al. | .................. 239/461 |
| 2002/0174657 A1 | * | 11/2002 | Rice et al. | ..................... 60/746 |
| 2004/0148936 A1 | * | 8/2004 | Moriya et al. | ................. 60/737 |
| 2005/0268616 A1 | * | 12/2005 | Widener | ....................... 60/776 |
| 2007/0227156 A1 | * | 10/2007 | Saito et al. | .................... 60/772 |

FOREIGN PATENT DOCUMENTS

| | | |
|---|---|---|
| JP | 8-261465 | 10/1996 |
| JP | 11-14055 | 1/1999 |

OTHER PUBLICATIONS

Official Action dated Sep. 4, 2009 issued in corresponding German Application No. 102006003577.1-13 w/English language translation.

* cited by examiner

*Primary Examiner*—Michael Cuff
*Assistant Examiner*—Phutthiwat Wongwian
(74) *Attorney, Agent, or Firm*—Westerman, Hattori, Daniels & Adrian, LLP

(57) ABSTRACT

A gas turbine combustor having an inner tube and a transition pipe connected together is provided. The combustor includes an internal swirler and an external swirler. The internal swirler is composed of a cylindrical inward swirler ring disposed concentrically with respect to a central axis of the inner tube, and a plurality of inward swirler vanes provided on an outer peripheral surface of the inward swirler ring. The external swirler is composed of a cylindrical outward swirler ring disposed on an outer peripheral side of the inward swirler vanes and concentrically with respect to the inward swirler ring, and a plurality of outward swirler vanes provided on an outer peripheral surface of the outward swirler ring. The internal swirler and the external swirler are disposed within the inner tube.

1 Claim, 9 Drawing Sheets

COMBUSTOR OF GAS TURBINE WITH CONCENTRIC SWIRLER VANES

BACKGROUND OF THE INVENTION

1. Field of the Invention

This invention relates to a combustor of a gas turbine, which is preferably applied to a gas turbine having a high pressure ratio, and which can be designed to achieve stable combustion and reduce the occurrence of nitrogen oxides ($NO_x$)

2. Description of the Related Art

A gas turbine used for power generation is composed of a compressor, a combustor and a turbine as main members. Many gas turbines have a plurality of combustors, mix air compressed by the compressor and a fuel supplied to the combustors, and burn the mixture in each combustor to generate a combustion gas at a high temperature. The high-temperature combustion gas is supplied to the turbine to drive the turbine rotationally.

An example of the combustor of a conventional gas turbine will be described with reference to FIG. 8.

As shown in FIG. 8, a plurality of combustors 10 of the gas turbine are arranged in an annular configuration in a combustor casing 11 (only one combustor is shown in FIG. 8). The combustor casing 11 and a gas turbine casing 12 are full of compressed air and constitute a casing 13. Air compressed by a compressor is introduced into the casing 13. The introduced compressed air enters the interior of the combustor 10 through an air flow inlet 14 provided at an upstream portion of the combustor 10. Inside an inner tube 15 of the combustor 10, a fuel supplied through fuel nozzles 16 and compressed air are mixed to burn. A combustion gas produced by combustion is supplied to a turbine room through a transition pipe 17 to rotate a turbine rotor.

In recent years, environmental regulations have been tightened, and various improvements have been made to decrease the concentrations of $NO_x$ (nitrogen oxides) in an exhaust gas from the gas turbine. The so-called rich-lean combustion process is known as a gas turbine combustion technology designed to reduce the occurrence of $NO_x$.

According to the rich-lean combustion process, combustion in a fuel-rich state (i.e., rich state) is performed in a first combustion region (in the example of FIG. 8, for instance, a middle region of an internal space of the inner tube 15), while combustion in a fuel-lean state (i.e., lean state) is performed in a second combustion region (in the example of FIG. 8, for instance, a peripheral edge region of the internal space of the inner tube 15). In this case, the fuel-air ratio of the entire combustor (i.e., the overall fuel-air ratio obtained by averaging the fuel-air ratios in the rich state and the fuel-air ratios in the lean state) is controlled so as to take a value corresponding to the operating state of the gas turbine. In the case of such rich-lean combustion, complete diffusive combustion (combustion in the absence of premixing with air) takes place in the rich combustion region, and complete premixed combustion is performed in the lean combustion region.

As is generally known, the relationship between the fuel-air ratio (equivalence ratio) and the amount of $NO_x$ generated is as shown in FIG. 9. A large amount of $NO_x$ is generated at an equivalence ratio φ in the vicinity of 1, and the amount of $NO_x$ generated is small in the lean region (φ<1) and in the rich region (φ>1). The rich-lean combustion process can reduce the amount of $NO_x$ generated, as a whole, because this process enables combustion to be performed in the lean region (φ<1) with a small amount of $NO_x$ generated and in the rich region (φ>1) with a similarly small amount of $NO_x$ generated.

For reference, the equivalence ratio will be described.

The equivalence ratio φ is defined as the ratio mf/mf* where mf* is the amount of fuel which uses 100% of oxygen in a certain amount of air and completely burns, and mf is the amount of fuel which is actually given.

Based on φ=1, φ<1 is taken as fuel-lean (lean) and φ>1 as fuel-rich (rich).

The inventor of this invention is developing a 1700° C.-class gas turbine at a high pressure ratio (pressure ratio of 25 or higher). With such a gas turbine at a high pressure ratio, the temperature of air flowing into the combustor is very high (500 to 600° C.). With a conventional gas turbine, the pressure ratio was of the order of 20 to 21, and the temperature of air flowing into the combustor was of the order of 450° C.

The gas turbine at such a high pressure ratio has been found to pose the following disadvantages, if the rich-lean combustion technology of the prior art is employed unchanged:

(1) Since the pressure ratio is high and the air (gas) energy is high, flashback is very likely to occur at a premixing nozzle portion for forming lean combustion.

(2) On the rich combustion side, complete diffusive combustion at an equivalence ratio of 1 takes place. Thus, the temperature of air flowing into the combustor is very high (500 to 600° C.). Partly because of this, the temperature of the flame front becomes so high that $NO_x$ is prone to occur.

The present invention has been accomplished in light of the above-described problems with the earlier technologies. It is an object of the invention to provide a combustor which can achieve stable combustion and decrease $NO_x$ even in a gas turbine having a high pressure ratio now under development.

SUMMARY OF THE INVENTION

A first aspect of the present invention is a combustor of a gas turbine, which is composed of an inner tube and a transition pipe connected together, comprising:

an internal swirler composed of a cylindrical inward swirler ring disposed concentrically with respect to a central axis of the inner tube, and a plurality of inward swirler vanes provided on an outer peripheral surface of the inward swirler ring; and an external swirler composed of a cylindrical outward swirler ring disposed on an outer peripheral side of the inward swirler vanes and concentrically with respect to the inward swirler ring, and a plurality of outward swirler vanes provided on an outer peripheral surface of the outward swirler ring, the internal swirler and the external swirler being disposed within the inner tube.

A second aspect of the present invention is a combustor of a gas turbine, which is composed of an inner tube and a transition pipe connected together, comprising:

an internal swirler composed of a cylindrical inward swirler ring disposed concentrically with respect to a central axis of the inner tube, and a plurality of inward swirler vanes provided on an outer peripheral surface of the inward swirler ring; and an external swirler composed of a cylindrical outward swirler ring disposed on an outer peripheral side of the inward swirler vanes and concentrically with respect to the inward swirler ring, and a plurality of outward swirler vanes provided on an outer peripheral surface of the outward swirler ring, the internal swirler and the external swirler being disposed within the inner tube, and wherein injection holes for injecting a fuel are formed in the internal swirler and the external swirler.

A third aspect of the present invention is a combustor of a gas turbine, which is composed of an inner tube and a transition pipe connected together, comprising:

an internal swirler composed of a cylindrical inward swirler ring disposed concentrically with respect to a central axis of the inner tube, and a plurality of inward swirler vanes provided on an outer peripheral surface of the inward swirler ring; and an external swirler composed of a cylindrical outward swirler ring disposed on an outer peripheral side of the inward swirler vanes and concentrically with respect to the inward swirler ring, and a plurality of outward swirler vanes provided on an outer peripheral surface of the outward swirler ring, the internal swirler and the external swirler being disposed within the inner tube, and wherein injection holes for injecting a fuel toward air passing between the inward swirler ring and the outward swirler ring to form an air-fuel mixture in a fuel-rich state are disposed at positions of the inward swirler ring downstream of the inward swirler vanes with respect to a flowing direction of air, and at positions of the outward swirler ring downstream of the inward swirler vanes with respect to the flowing direction of air, and injection holes for injecting the fuel toward air passing between the outward swirler ring and the inner tube to form an air-fuel mixture in a fuel-lean state are disposed at positions of the outward swirler ring downstream of the outward swirler vanes with respect to the flowing direction of air, and at positions of the inner tube downstream of the outward swirler vanes with respect to the flowing direction of air.

A fourth aspect of the present invention is a combustor of a gas turbine, which is composed of an inner tube and a transition pipe connected together, comprising:

an internal swirler composed of a cylindrical inward swirler ring disposed concentrically with respect to a central axis of the inner tube, and a plurality of inward swirler vanes provided on an outer peripheral surface of the inward swirler ring; and an external swirler composed of a cylindrical outward swirler ring disposed on an outer peripheral side of the inward swirler vanes and concentrically with respect to the inward swirler ring, and a plurality of outward swirler vanes provided on an outer peripheral surface of the outward swirler ring, the internal swirler and the external swirler being disposed within the inner tube, and wherein injection holes for injecting a fuel toward air passing between the inward swirler ring and the outward swirler ring to form an air-fuel mixture in a fuel-rich state are disposed in a rear end surface of the inward swirler ring which is a most downstream position with respect to a flowing direction of air, and in a rear end surface of the outward swirler ring which is a most downstream position with respect to the flowing direction of air, and injection holes for injecting the fuel toward air passing between the outward swirler ring and the inner tube to form an air-fuel mixture in a fuel-lean state are disposed in a rear end surface of the outward swirler ring which is a most downstream position with respect to the flowing direction of air, and in a rear end surface of the inner tube which is a most downstream position with respect to the flowing direction of air.

A fifth aspect of the present invention is a combustor of a gas turbine, which is composed of an inner tube and a transition pipe connected together, comprising:

an internal swirler composed of a cylindrical inward swirler ring disposed concentrically with respect to a central axis of the inner tube, and a plurality of inward swirler vanes provided on an outer peripheral surface of the inward swirler ring; and an external swirler composed of a cylindrical outward swirler ring disposed on an outer peripheral side of the inward swirler vanes and concentrically with respect to the inward swirler ring, and a plurality of outward swirler vanes provided on an outer peripheral surface of the outward swirler ring, the internal swirler and the external swirler being disposed within the inner tube, and wherein injection holes for injecting a fuel toward air passing between the inward swirler ring and the outward swirler ring to form an air-fuel mixture in a fuel-rich state are disposed in rear edges of the inward swirler vanes, and injection holes for injecting the fuel toward air passing between the outward swirler ring and the inner tube to form an air-fuel mixture in a fuel-lean state are disposed in rear edges of the outward swirler vanes.

A sixth aspect of the present invention is a combustor of a gas turbine, which is composed of an inner tube and a transition pipe connected together, comprising:

an internal swirler composed of a cylindrical inward swirler ring disposed concentrically with respect to a central axis of the inner tube, and a plurality of inward swirler vanes provided on an outer peripheral surface of the inward swirler ring; and an external swirler composed of a cylindrical outward swirler ring disposed on an outer peripheral side of the inward swirler vanes and concentrically with respect to the inward swirler ring, and a plurality of outward swirler vanes provided on an outer peripheral surface of the outward swirler ring, the internal swirler and the external swirler being disposed within the inner tube, and wherein injection holes for injecting a fuel toward air passing between the inward swirler ring and the outward swirler ring to form an air-fuel mixture in a fuel-rich state are disposed in vane surfaces of the inward swirler vanes, and injection holes for injecting the fuel toward air passing between the outward swirler ring and the inner tube to form an air-fuel mixture in a fuel-lean state are disposed in vane surfaces of the outward swirler vanes.

The double swirler having the internal swirler and the external swirler disposed concentrically is disposed within the inner tube. Also, rich combustion is performed on the inner peripheral side, while lean combustion is performed on the outer peripheral side. Thus, $NO_x$ can be decreased, and stable combustion can be achieved.

Furthermore, if the transition pipe is provided with the scoops, the high temperature region within the transition pipe can be cooled satisfactorily, and $NO_x$ can be decreased further.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE INVENTION

Embodiments of the present invention will be described in detail with reference to the accompanying drawings.

Embodiment 1

A combustor 100 according to Embodiment 1 of the present invention will be described with reference to FIG. 1 which is a longitudinal sectional view, and FIG. 2 which is a front view. The combustor 100 according to Embodiment 1 is applied to a 1700° C.-class gas turbine at a high pressure ratio (pressure ratio of 25 or higher) which is being newly developed.

Figure 1:
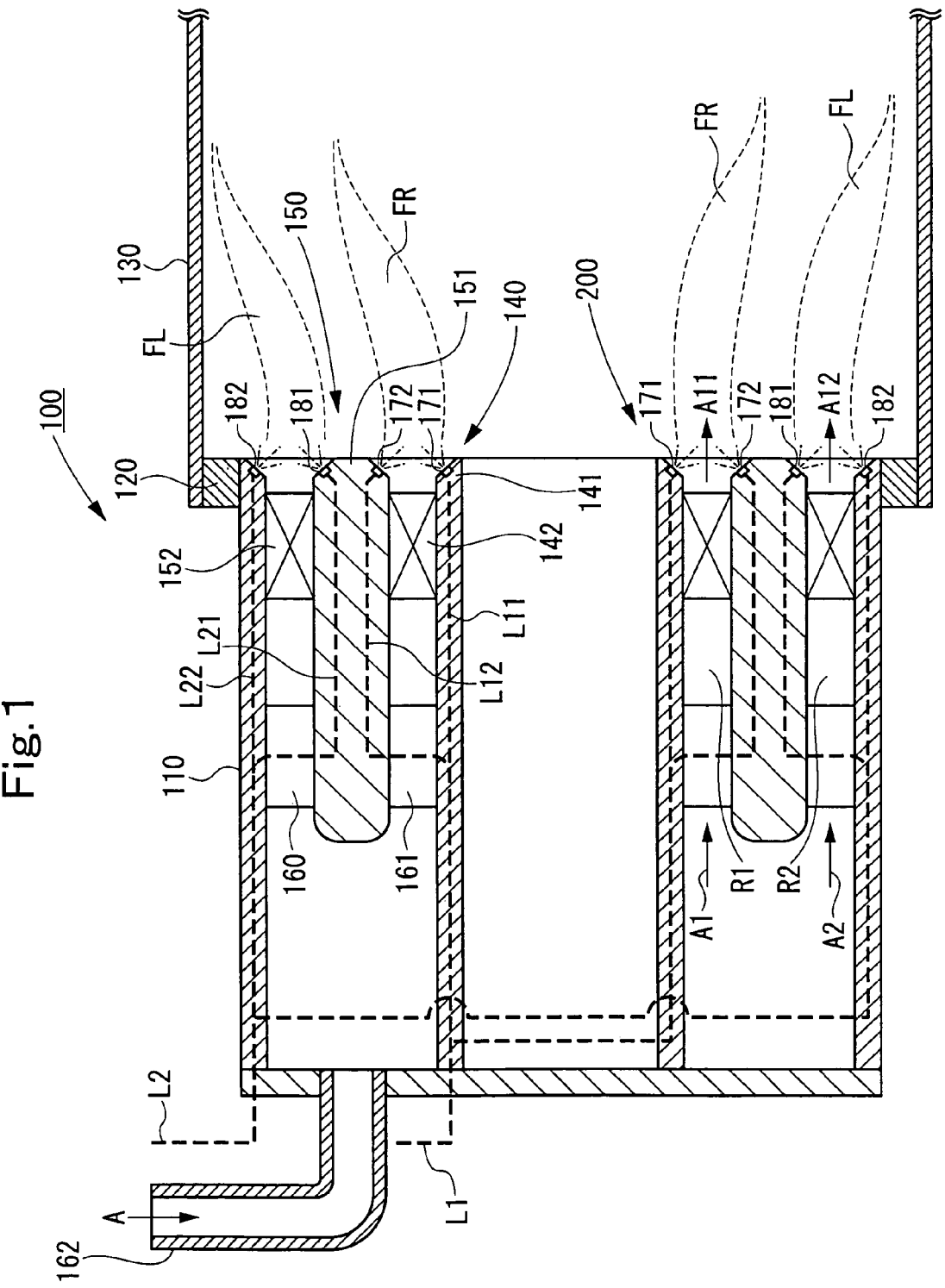
FIG. 1 is a longitudinal sectional view showing a combustor according to Embodiment 1 of the present invention.
Figure 2:
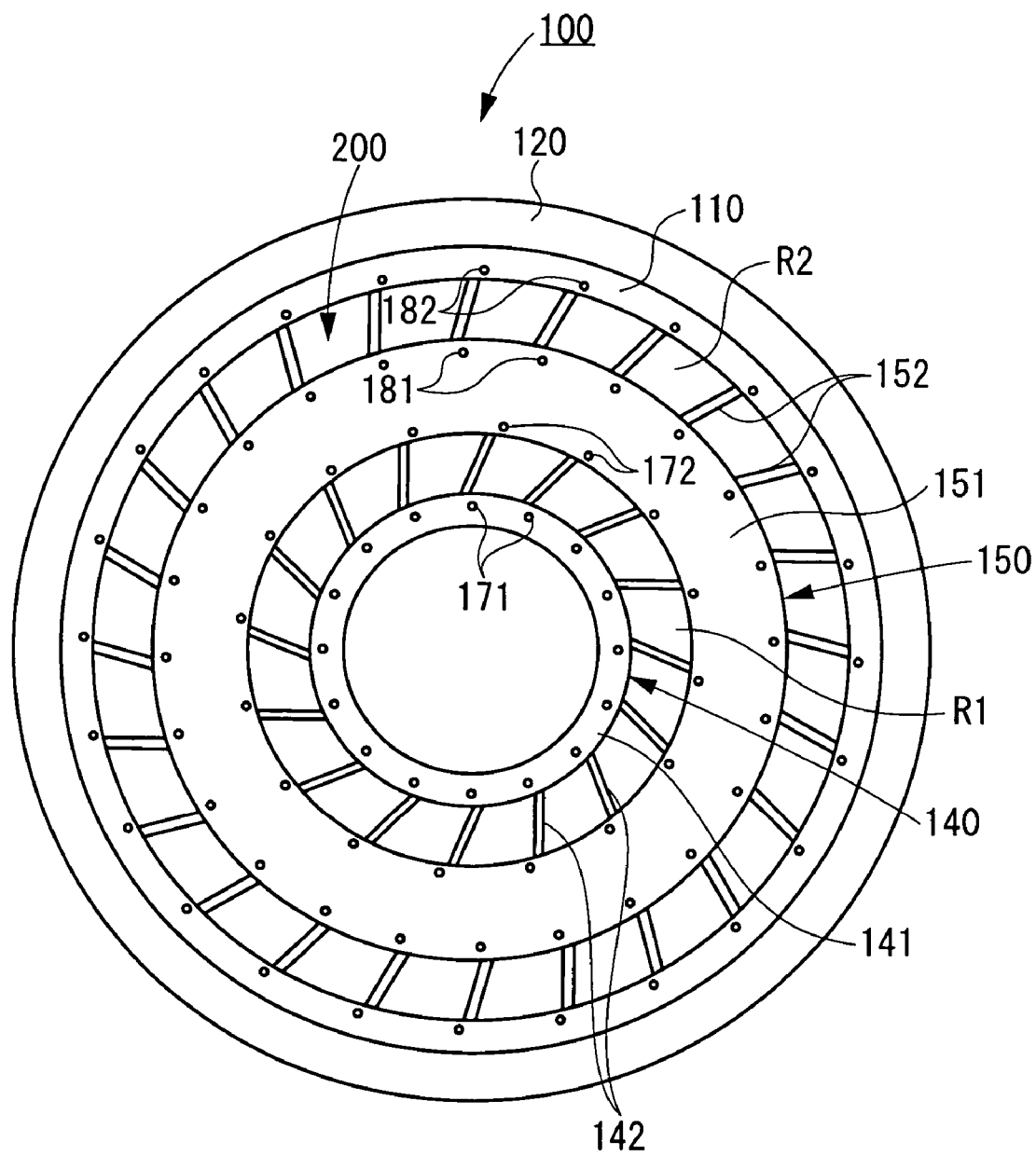
FIG. 2 is a front view showing the combustor according to Embodiment 1 of the present invention.

As shown in FIGS. 1 and 2, the rear edge of an inner tube 110 is connected to the front edge of a transition pipe 130 via a connecting ring 120.

An internal swirler 140 and an external swirler 150 are disposed inside the inner tube 110. That is, the internal swirler 140 on the inner peripheral side and the external swirler 150 on the outer peripheral side are concentrically disposed about the central axis of the inner tube 110. A double swirler 200 is formed by the internal swirler 140 and the external swirler 150.

A swirler ring 141 of the internal swirler 140 is cylindrical, and is disposed concentrically with respect to the central axis of the inner tube 110. A multiplicity of (16 in this embodiment) swirler vanes 142 are provided on the outer peripheral surface of the cylindrical swirler ring 141. The swirler vanes 142 are arranged at equally spaced positions along the circumferential direction of the outer peripheral surface of the swirler ring 141, and are installed to extend in the axial direction of the swirler ring 141. The swirler vanes 142 swirl compressed air flowing (from left to right in FIG. 1) through the interior of the inner tube 110 to form a swirl air flow A11.

A swirler ring 151 of the external swirler 150 is cylindrical, and is disposed on the outer peripheral side of the swirler vanes 142 and concentrically with respect to the swirler ring 141. A multiplicity of (24 in this embodiment) swirler vanes 152 are provided on the outer peripheral surface of the cylindrical swirler ring 151. The swirler vanes 152 are arranged at equally spaced positions along the circumferential direction of the outer peripheral surface of the swirler ring 151, and are installed to extend in the axial direction of the swirler ring 151. The swirler vanes 152 swirl compressed air flowing (from left to right in FIG. 1) through the interior of the inner tube 110 to form a swirl air flow A12.

The swirler ring 151 of the external swirler 150 is connected and fixed to the inner peripheral surface of the inner tube 110 via a plurality of coupling members 160 arranged with spacing in the circumferential direction. The swirler ring 141 of the internal swirler 140 is connected and fixed to the inner peripheral surface of the swirler ring 151 via a plurality of coupling members 161 arranged with spacing in the circumferential direction.

Because of the above-described configuration, an air passage R1 is formed between the outer peripheral surface of the swirler ring 141 located inwardly and the inner peripheral surface of the swirler ring 151 located outwardly. Also, an air passage R2 is formed between the outer peripheral surface of the outward swirler ring 151 and the inner peripheral surface of the inner tube 110.

Compressed air A is supplied into the internal space of the inner tube 110 via an air inlet pipe 162. This compressed air A flows from right to left in FIG. 1 (flows from the position of disposition of the air inlet pipe 162 toward the transition pipe 130), and flows through the interior of the inner tube 110 while separating into compressed air A1 passing through the air passage R1 and compressed air A2 passing through the air passage R2.

The compressed air A1 passing through the air passage R1 is swirled by the swirler vanes 142 to become the swirl air flow A11, which is blown out from the rear edge of the internal swirler 140.

The compressed air A2 passing through the air passage R2 is swirled by the swirler vanes 152 to become the swirl air flow A12, which is blown out from the rear edge of the outer swirler 150.

Many injection holes 171 for injecting a fuel are formed in the rear end surface of the inward swirler ring 141 (the most downstream position of the swirler ring 141 with respect to the flowing direction of air). These injection holes 171 blow out the fuel toward the swirl air flow A11 blown out through the air passage R1.

Many injection holes 172 for injecting fuel are formed in the inner peripheral side of the rear end surface of the outward swirler ring 151 (the most downstream position of the swirler ring 151 with respect to the flowing direction of air). These injection holes 172 blow out the fuel toward the swirl air flow A11 blown out through the air passage R1.

Many injection holes 181 for injecting fuel are formed in the outer peripheral side of the rear end surface of the outward swirler ring 151. These injection holes 181 blow out the fuel toward the swirl air flow A12 blown out through the air passage R2.

Many injection holes 182 for injecting fuel are formed in the rear end surface of the inner tube 110 (the most downstream position of the inner tube 110 with respect to the flowing direction of air). These injection holes 182 blow out the fuel toward the swirl air flow A12 blown out through the air passage R2.

The combustor 100 is furnished with fuel supply lines as schematically indicated by dashed lines in FIG. 1. That is, the combustor 100 has a first fuel supply line L1, fuel supply lines L11, L12 branched from the fuel supply line L1, a second fuel supply line L2, and fuel supply lines L21, L22 branched from the fuel supply line L2.

The injection holes 171 are supplied with the fuel via the fuel supply lines L1, L11, and the supplied fuel is injected from the injection holes 171 toward the swirl air flow A11.

The injection holes 172 are supplied with the fuel via the fuel supply lines L1, L12, and the supplied fuel is injected from the injection holes 172 toward the swirl air flow A11.

At this time, the amount of the fuel supplied via the fuel supply lines L1, L11, L12 is adjusted such that an air-fuel mixture of the fuel injected from the injection holes 171, 172 and the swirl air flow A11 becomes fuel-rich. For example, the equivalence ratio is adjusted to be of the order of 1.4.

As a result, a rich combustion flame FR occurring upon combustion of the air-fuel mixture of the fuel injected from the injection holes 171, 172 and the swirl air flow A11 burns downstream of the double swirler 200 and in a central (inner peripheral) portion of the internal space of the transition pipe 130.

The injection holes 181 are supplied with the fuel via the fuel supply lines L2, L21, and the supplied fuel is injected from the injection holes 181 toward the swirl air flow A12.

The injection holes 182 are supplied with the fuel via the fuel supply lines L2, L22, and the supplied fuel is injected from the injection holes 182 toward the swirl air flow A12.

At this time, the amount of the fuel supplied via the fuel supply lines L2, L21, L22 is adjusted such that an air-fuel mixture of the fuel injected from the injection holes 181, 182 and the swirl air flow A12 becomes fuel-lean. For example, the equivalence ratio is adjusted to be of the order of 0.6.

As a result, a lean combustion flame FL occurring upon combustion of the air-fuel mixture of the fuel injected from the injection holes 181, 182 and the swirl air flow A12 burns downstream of the double swirler 200 and in an outer (outer peripheral) portion of the internal space of the transition pipe 130.

A front portion of the transition pipe 130 is divided into a high temperature region where the rich combustion flame FR on the inner peripheral side is held, and a low temperature region where the lean combustion flame FL on the outer peripheral side is held. In a rear portion of the transition pipe 130, on the other hand, a high temperature combustion gas and a low temperature combustion gas are mixed by the swirl air flows to form a combustion gas at a uniform temperature.

In the present Embodiment 1, the rich combustion flame FR burning on the inner peripheral side is short of oxygen, in comparison with a diffusion flame at an equivalence ratio of 1, and thus can lower the temperature of the flame front. Thus, the occurrence of $NO_x$ on the rich combustion side can be reduced. The lean combustion flame FL burning on the outer peripheral side involves a small amount of fuel and has a low combustion gas temperature, so that the occurrence of $NO_x$ is minimal.

Figure 9:
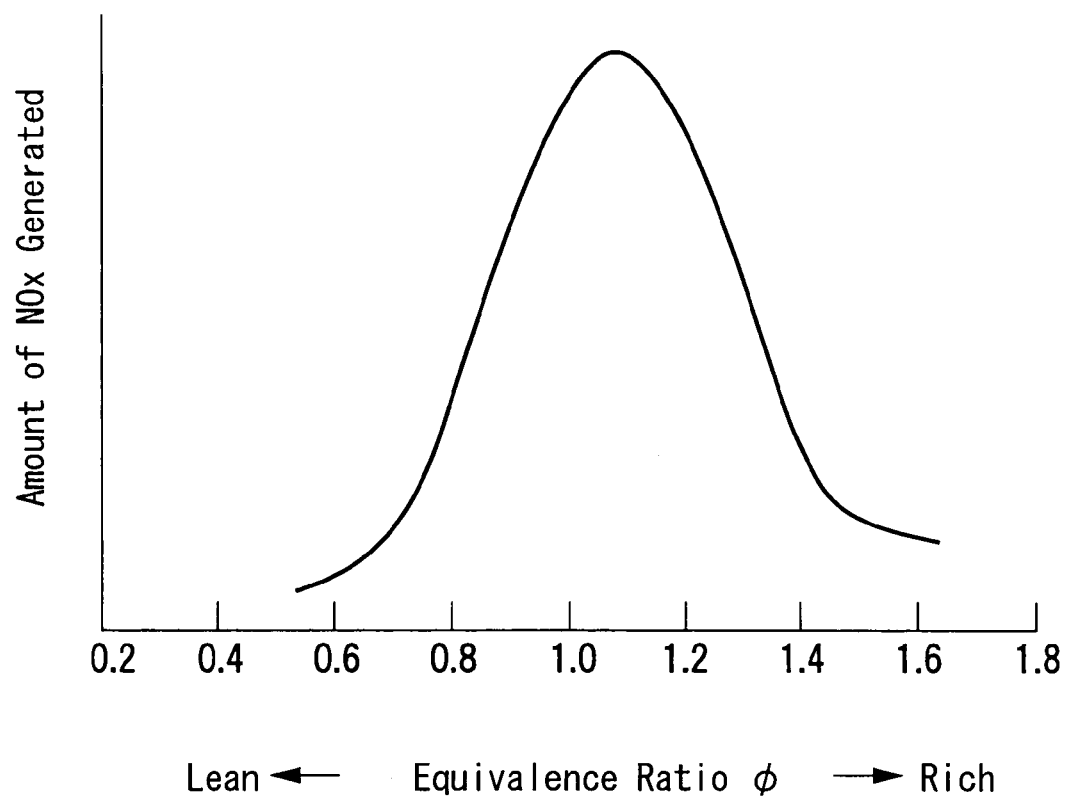
FIG. 9 is a characteristic view showing the relationship between the equivalence ratio and the amount of $NO_x$ generated.

Since combustion is performed in the lean region and the rich region as noted above, the occurrence of $NO_x$ can be reduced as a whole (see FIG. 9).

In the present Embodiment 1, moreover, the fuel is injected from the rear edge of the double swirler 200, concretely, the rear end surfaces of the swirler ring 141, the swirler ring 151, and the inner tube 110. Thus, the distances between the positions of injection of the fuel and the flames FR, FL are short. Since the distances between the positions of fuel injection and the flames FR, FL are short as described here, the occurrence of combustion vibrations can be suppressed, and stable combustion can be performed.

Furthermore, in the present Embodiment 1, mixing of air and fuel can be performed downstream of the double swirler 200, namely, within the transition pipe 130. Thus, flashback can be prevented, and flashback of the lean combustion flame FL, in particular, can be prevented.

In Embodiment 1, the injection holes 171, 172, 181, 182 are formed in the rear end surfaces of the swirler ring 141, the swirler ring 151 and the inner tube 110. However, the positions of formation of the injection holes 171, 172, 181, 182 are not limited to the rear end surfaces. These positions may be any positions, if they are positions which are downstream (rightward in FIG. 1) of the swirler vanes 142, 152 with respect to the flowing direction of air and which enable the fuel to be injected toward the swirl air flows A11, A12.

Besides, if the problem of flashback is absent, the injection holes can be disposed upstream of the swirler vanes 142, 152 with respect to the flowing direction of air in order to promote premixing.

Embodiment 2

Next, Embodiment 2 of the present invention will be described with reference to FIG. 3 which is a longitudinal sectional view, and FIG. 4 which is a sectional view of a swirler vane 142 (or swirler vane 152). The same constituent portions as those in Embodiment 1 will not be described, and different portions from those in Embodiment 1 will be mainly explained.

In Embodiment 2, injection holes 173 are formed in the rear edges of the respective swirler vanes 142 of an internal swirler 140, and injection holes 183 are formed in the rear edges of the respective swirler vanes 152 of an external swirler 150.

The injection holes 173 are supplied with a fuel by a fuel supply line L1, and the injection holes 183 are supplied with the fuel by a fuel supply line L2. In Embodiment 2, the fuel supply lines are fewer than those in Embodiment 1. That is, Embodiment 1 needs the branched fuel supply lines L11, L12, L21, L22. ON the other hand, Embodiment 2 does not require such branched fuel supply lines, and can simplify the configuration of the fuel supply lines accordingly.

The fuel injected from the injection holes 173 mixes with a swirl air flow A11, while the fuel injected from the injection holes 183 mixes with a swirl air flow A12. At this time, fuel injection is performed along the flowing direction of the swirl air flows A11, A12. Thus, even if the fuel-air ratio is changed in accordance with load fluctuations, changes in the concentration distribution of the fuel in the downstream region are decreased, so that even with a change in the fuel-air ratio, satisfactory combustion can be maintained.

Downstream of the swirler vanes 142, 152, wakes occur. These wakes, which are turbulences, promote the mixing of the fuel and the swirl air flows A11, A12, resulting in satisfactory mixing. That is, the interaction of the swirl flows and the wakes renders the mixing of the fuel and the swirl air flows A11, A12 more satisfactory, and can achieve stable combustion.

Embodiment 3

Next, Embodiment 3 of the present invention will be described with reference to FIG. 5 which is a longitudinal sectional view, and FIG. 6 which is a sectional view of a swirler vane 142 (or swirler vane 152).

Since Embodiment 3 is a modification of Embodiment 2, only portions different from those in Embodiment 2 will be explained.

In Embodiment 2, the injection holes 173, 183 are formed at the rear edges of the swirler vanes 142, 152. In Embodiment 3, injection holes 174, 184 are formed in side surfaces (vane surfaces) of the swirler vanes 142, 152.

The directions of injection of fuel injected from the injection holes 174, 184 are directions intersecting (nearly perpendicularly intersecting) the flowing direction of swirl air flows A11, A12. Thus, the mixing of the injected fuel and the swirl air flows A11, A12 is promoted further. Hence, a pre-mixture of the fuel and air is formed, and this pre-mixture burns satisfactorily in a transition pipe 130.

Embodiment 4

Next, Embodiment 4 of the present invention will be described with reference to FIG. 7 which is a longitudinal sectional view. The same constituent portions as those in Embodiment 1 will not be described, and different portions from those in Embodiment 1 will be mainly explained.

In Embodiment 4, scoops (cylindrical members) 300 are installed at a plurality of locations along the circumferential direction of a transition pipe 130. These plural (for example, 3 to 8) scoops 300 establish communication between the internal space and the external space of the transition pipe 130. Thus, air at a low temperature (for example, of the order of 500 to 600° C.) present on the outer peripheral side of the transition pipe 130 is supplied toward a central axial portion of the internal space of the transition pipe 130. As a result, the temperature of a high temperature region (a region, for example, at a temperature of 2000° C.), which is existent in the central axial portion of the internal space of the transition pipe 130, and where rich combustion is taking place, is lowered at a stroke (is quenched) by air a at a low temperature (for example, of the order of 500 to 600° C.) which has flowed in. Consequently, the production of $NO_x$ is suppressed.

As described above, the high temperature region is cooled, at a stroke, by flowing the low temperature air a into the interior of the transition pipe 130 via the scoops 300. Thus, the generation of $NO_x$ can be suppressed more efficiently.

Figure 3:
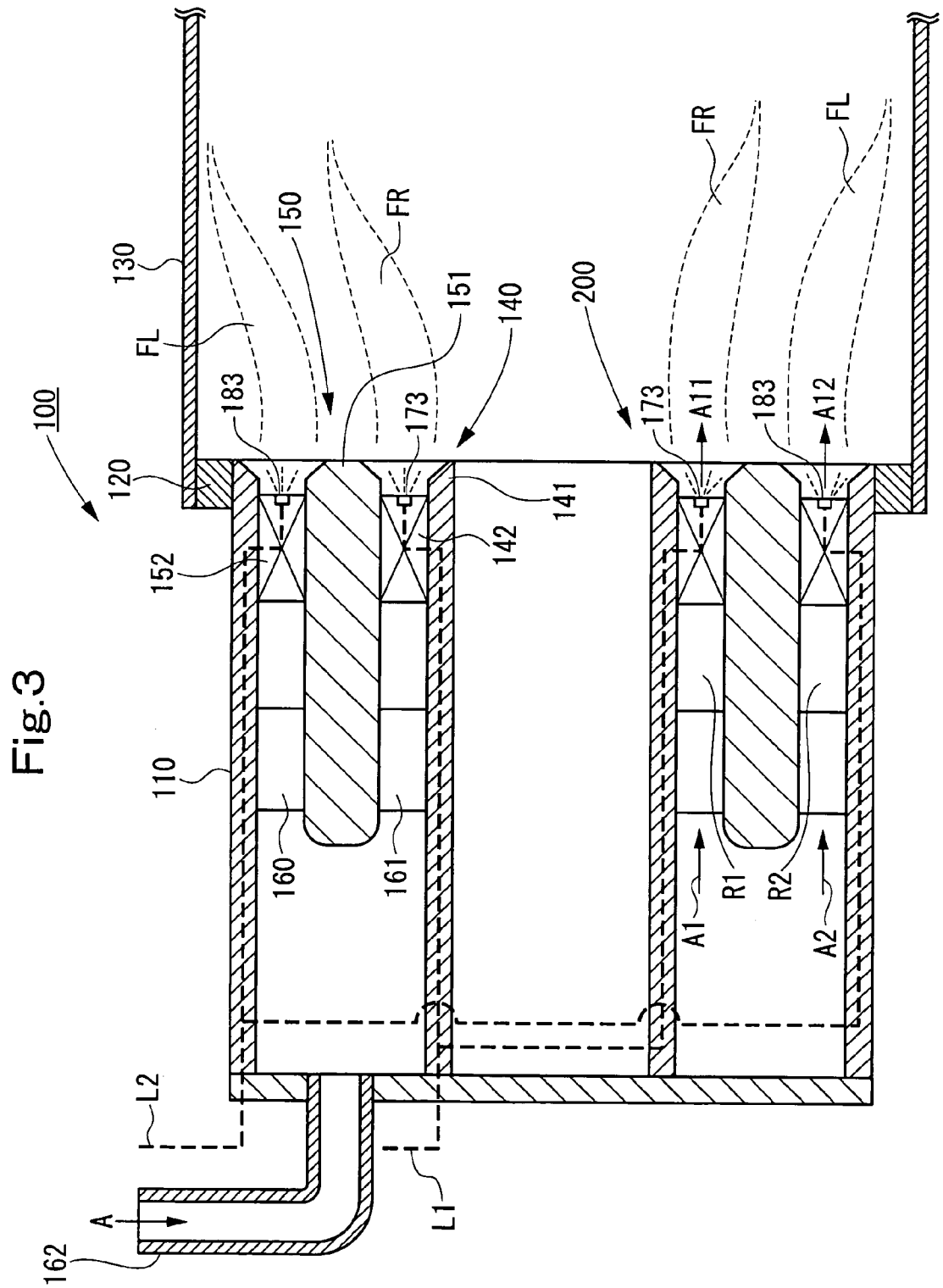
FIG. 3 is a longitudinal sectional view showing a combustor according to Embodiment 2 of the present invention.
Figure 4:
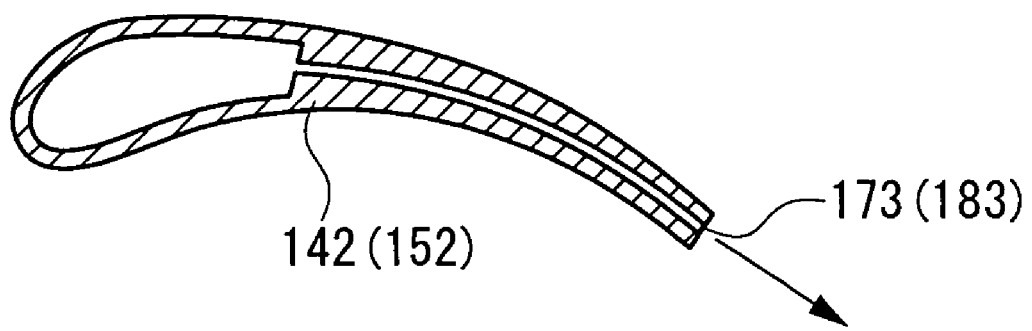
FIG. 4 is a sectional view showing a swirler vane of the combustor according to Embodiment 2 of the present invention.
Figure 5:
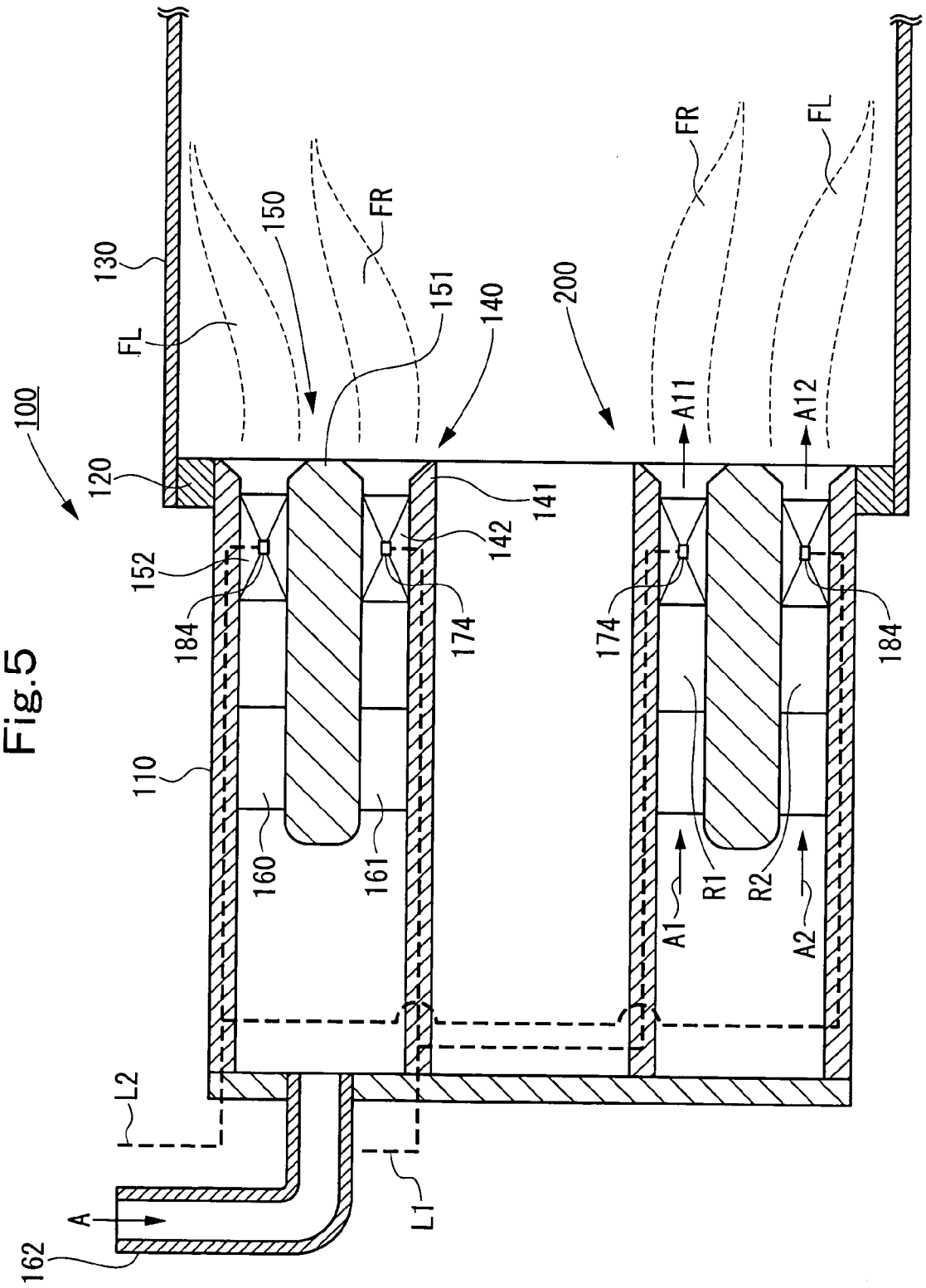
FIG. 5 is a longitudinal sectional view showing a combustor according to Embodiment 3 of the present invention.
Figure 6:
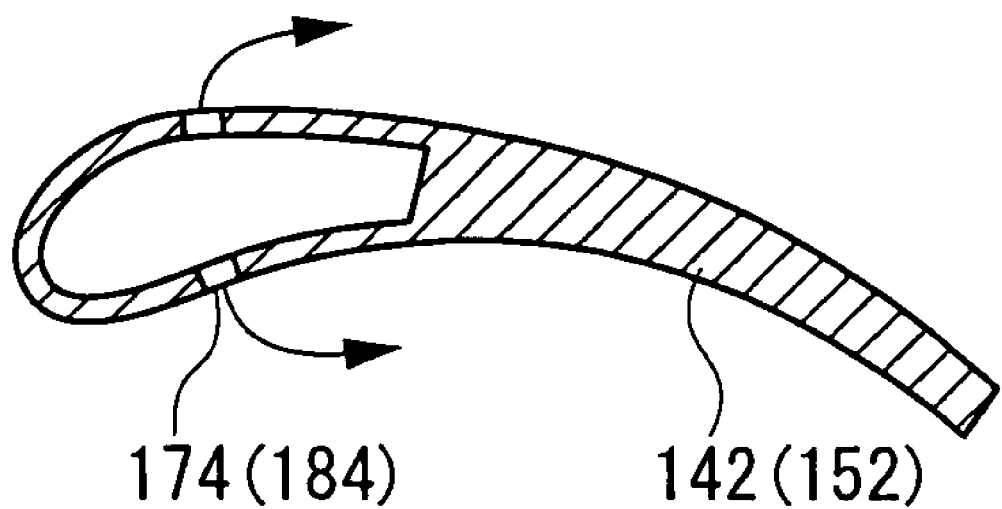
FIG. 6 is a sectional view showing a swirler vane of the combustor according to Embodiment 3 of the present invention.
Figure 7:
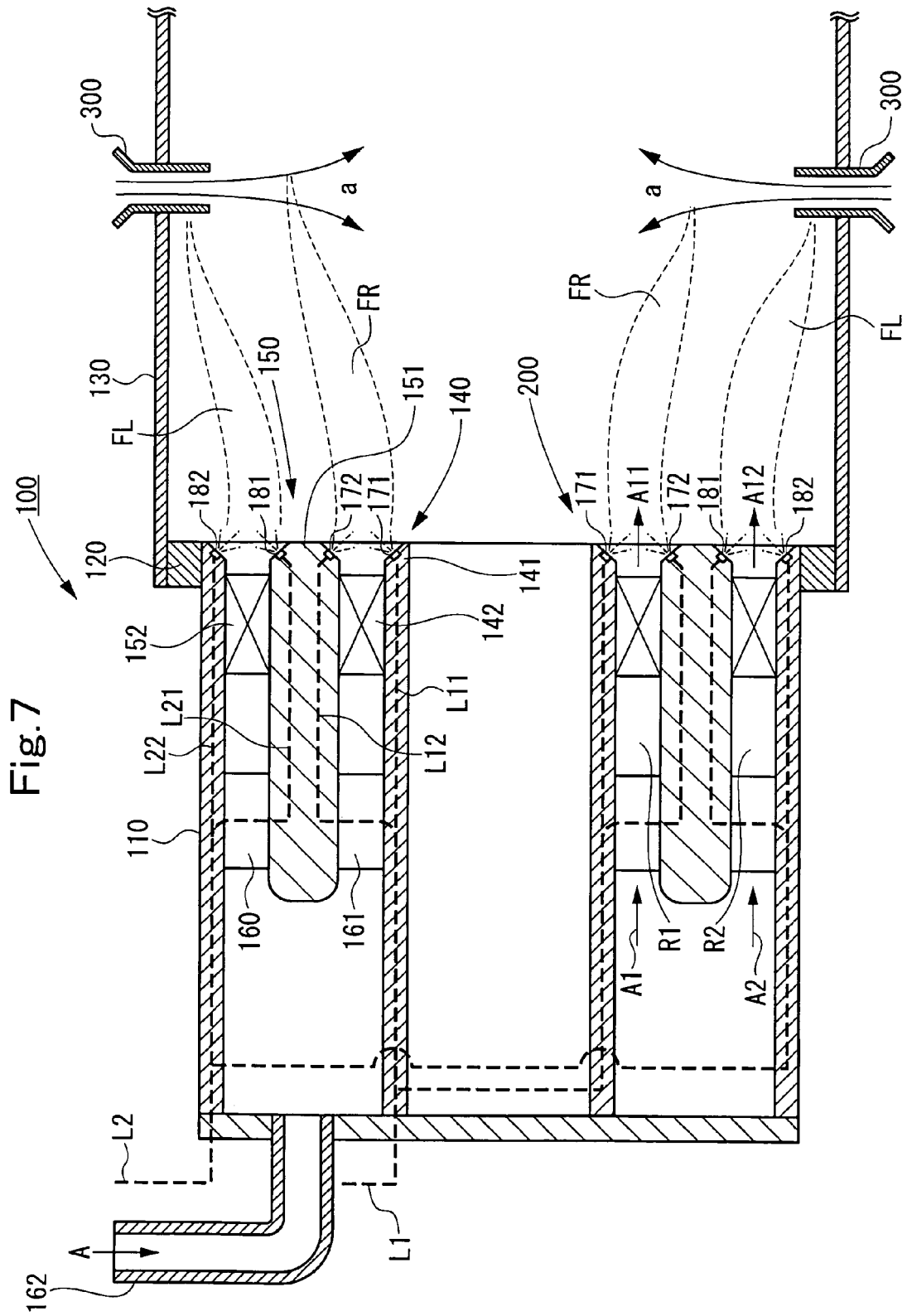
FIG. 7 is a longitudinal sectional view showing a combustor according to Embodiment 4 of the present invention.
Figure 8:
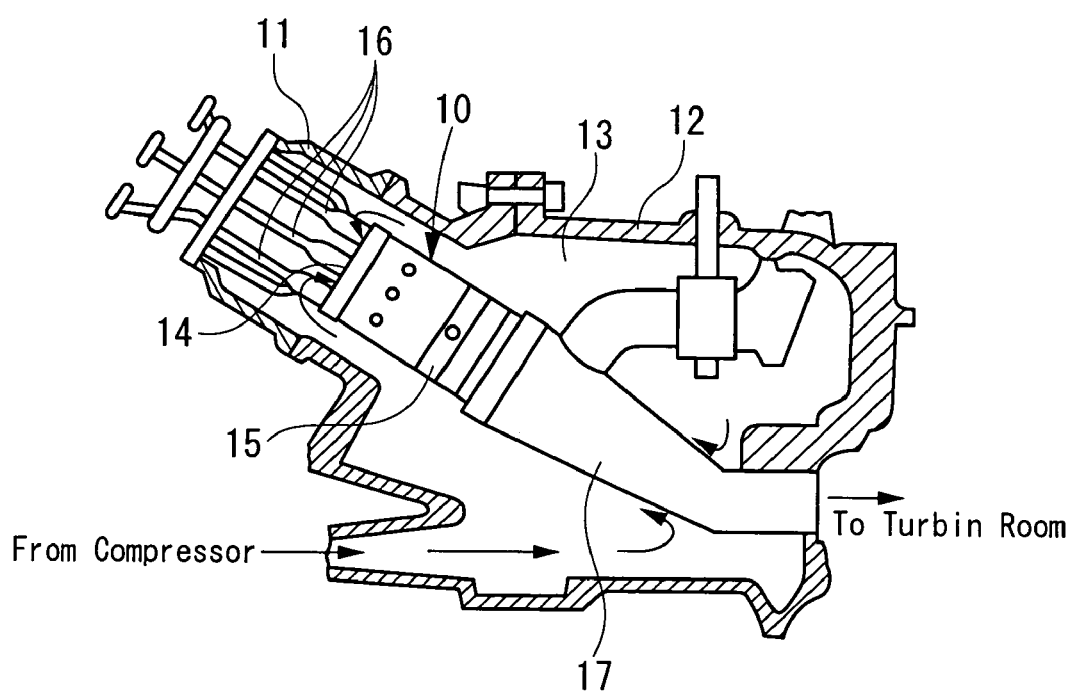
FIG. 8 is a configurational drawing showing a conventional combustor.

The same scoops as those in Embodiment 4 shown in FIG. 7 may be mounted in Embodiment 2 shown in FIG. 3 and Embodiment 3 shown in FIG. 5. In this case, the generation of $NO_x$ can be suppressed more efficiently as in Embodiment 4.

The invention thus described, it will be obvious that the same may be varied in many ways. Such variations are not to be regarded as a departure from the spirit and scope of the invention, and all such modifications as would be obvious to one skilled in the art are intended to be included within the scope of the following claims.

The invention claimed is:

1. A combustor of a gas turbine, which is composed of an inner tube and a transition pipe connected together, comprising:
    an internal swirler composed of a cylindrical inward swirler ring disposed concentrically with respect to a central axis of the inner tube, and a plurality of inward swirler vanes provided on an outer peripheral surface of the inward swirler ring; and
    an external swirler composed of a cylindrical outward swirler ring disposed on an outer peripheral side of the inward swirler vanes and concentrically with respect to the inward swirler ring, and a plurality of outward swirler vanes provided on an outer peripheral surface of the outward swirler ring,
    the internal swirler and the external swirler being disposed within the inner tube,
    inward swirler vane injection holes disposed in vane surfaces of the inward swirler vanes;
    outward swirler vane injection holes disposed in vane surfaces of the outward swirler vanes, and
    fuel supply lines that supply a fuel to the inward and outward swirler injection holes wherein
    the inward swirler injection holes inject the fuel toward air passing between the inward swirler ring and the outward swirler ring to form an air-fuel mixture in a fuel-rich state, and
    the outward swirler injection holes inject the fuel toward air passing between the outward swirler ring and the inner tube to form an air-fuel mixture in a fuel-lean state.

* * * * *